April 15, 1947.                K. WILFERT ET AL                 2,419,104
                SPRINGING OF MOTOR CARS WITH SWINGING HALF AXLES
                            Filed Dec. 6, 1940
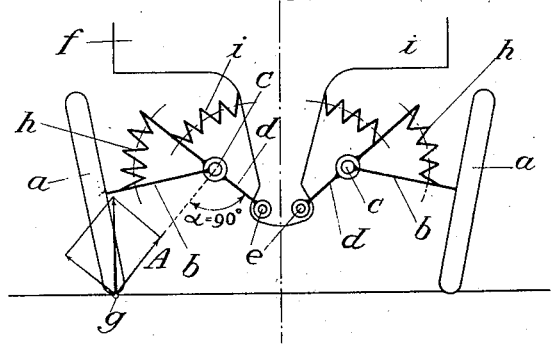
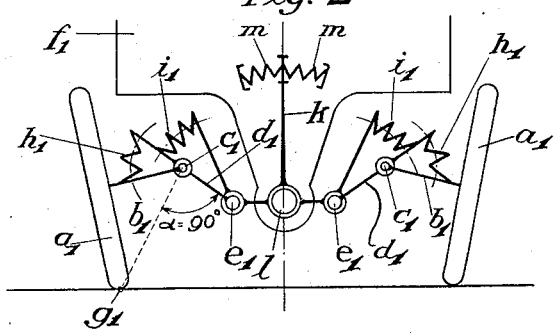
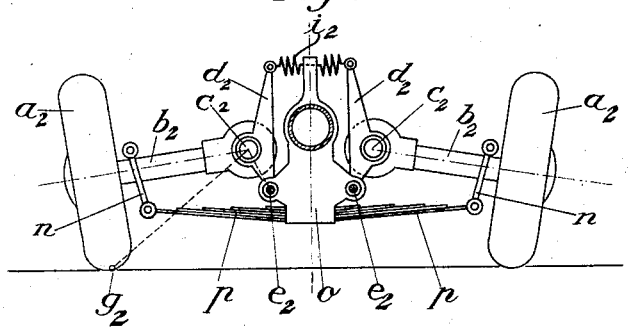

Patented Apr. 15, 1947

2,419,104

UNITED STATES PATENT OFFICE 2,419,104

SPRINGING OF MOTOR CARS WITH SWINGING HALF AXLES

Karl Wilfert, Sindelfingen, and Béla Barényi, Boblingen, Germany; vested in the Attorney General of the United States Application December 6, 1940, Serial No. 368,849
In Germany December 7, 1939

6 Claims. (Cl. 267—20)

The invention relates to a springing of motor cars with swinging half axles, especially so called pendulum half axles, swinging together with the wheels as one unit around an interior framesided joint. (The expression "frame" is here to be understood in the most comprehensive sense and comprises all construction aggregates which may fulfill the duty of the frame, for example, self contained car bodies.)

With the springing of such swinging half axles which are connected to the frame immediately by means of a joint, at the contact places of the wheels with the road, transverse forces arise working in corresponding manner between the swinging half axles and the frame. The shocks occurring herewith may produce under circumstances high stresses onto the frame and swinging phenomena.

Accordingly, it is a feature of the invention that the swinging half axles are arranged yieldingly with respect to the frame and to each other in transverse direction to the vehicle, and that especially in such a way that they may yield in transverse direction corresponding to the forces tending to an alteration of the track. Preferably the yieldingness herewith is chosen so great that the entire track alteration which would occur if the swinging half axles were not yieldingly journaled, may be fully compensated. This track alteration may amount to about 5 to 10 cm. altogether with vehicles having pendulum half axles. In many cases however it is sufficient if a partial compensation of the track alteration is made possible, if only the transverse shocks are yieldingly taken up in a satisfactory way.

According to a further feature of the invention the direction of the yieldingness is not exactly transverse to the riding direction, but is inclined to it at an angle, and especially at an angle which is determined by the connecting line between the contact point of the wheel with the road, and the inner or framesided joint of the pertaining half axle.

An especially practical type of the invention is the one in which the swinging half axles are journaled at their end on lever arms which may swing around pivots that are placed above or preferably below the joints for the swinging half axles. The swinging half axles may in this case be sprung against the lever arms or against the frame. The lever arms may be sprung against the frame or the swinging half axles. Also a springing of the swinging half axles against each other or of the lever arms against each other may be provided.

In the drawings:

Fig. 1 is a view showing one form of the invention;

Fig. 2 is a modified form of Fig. 1;

Fig. 3 is a view of a second modified form of the invention;

Fig. 4 is a view similar to Fig. 3 showing a different type of spring support.

In Figs. 1 and 2 two springing possibilities of pendulum half axles are shown diagrammatically, while Fig. 3 shows a more structural type.

In Fig. 1 the pendulum half axles $b$ carrying the wheels $a$ are jointed at lever arms $d$ at points $c$, said arms being jointed at $e$ to the frame $f$ or to a corresponding part of the vehicle. The lever arms $d$ are herewith so arranged that the straight connecting line between the contact point $g$ of the wheel with the road and the joint $c$ normally forms an angle $\alpha$, preferably equal to 90°, with the straight connecting line between the joints $c$ and $e$. The joint $c$ may herewith swing around point $e$ under the effect of force $A$. Force $A$ is a component of the vertical force acting through point $g$ and resolved along said line $g$—$c$. Hence, force $A$ produces a moment about point $e$ which equals to A times the distance $ce$ to thereby produce rotation of joint $c$ whereby the track alteration otherwise arising in the contact point $g$ is compensated. Although the moment of force produced by A about $c$ will be the maximum when the angle $\alpha$ is 90 degrees, it is evident that the track alteration will be compensated according to the same principle, but with lesser efficiency, than when this angle is greater or less than 90 degrees, provided, however that points $g$—$c$—$e$ do not lie in a straight line. It will be observed that when $\alpha$ is 90 degrees the effective lever arm about point $e$ acting at right angles to the direction of force A, is at its greatest, whereas for any other angle the effective lever arm will be reduced accordingly to thereby make the compensating mechanism less sensitive. As shown in Fig. 1 the pendulum half axle $b$ is sprung by means of a spring $h$ against the lever arm $d$, and in turn, the lever arm $d$ is sprung by means of a spring $i$, against the frame.

The type according to Fig. 2 is distinguished from the type Fig. 1 substantially by the fact that the joint $e_1$ around which the lever arms $d_1$ may swing, are not arranged immediately at the frame $f_1$ but at a compensating lever $k$ which may swing around a central pin $l$ at the frame $f_1$ against the action of the two springs $m$, and carries the joints $e_1$ for the two wheel suspensions. The springs $i_1$ in this case being interposed between the levers $d_1$ and the compensating lever $k$. The elements $a_1$, $b_1$, $c_1$, $g_1$, and $h_1$ correspond to elements $a$, $b$, $c$, $g$, and $h$ respectively in Fig. 1.

With the type according to Fig. 3 the swinging half axles or pendulum half axles $b_2$ are sprung by the medium of guiding pieces $n$ against the frame by the medium of a transverse laminated spring $p$ fastened to the frame or to a part $o$ connected to the frame. The lever arm $d_2$ carrying the inner joints $c_2$ of the swinging half axles is swingingly arranged also in this case around a lower joint $e_2$ and supported against the frame by means of spring $i_2$ in Fig. 3 or against the other lever arm $d_2$ by means of the spring $i_3$ in Fig. 4. The angle $g_2$—$c_2$—$e_2$ in Fig. 3 preferably amounts again to substantially 90°, whereby the joint $c_2$ may yield as well to the vertical as to the horizontal forces arising in it; however, this angle may vary more or less as previously stated. Fig. 4 is identical to Fig. 3 except for the above-mentioned spring support.

The arrangement may however be so made that the motion of the inner joint $c_2$ ensues exclusively in a direction transverse to the riding direction, the yieldingness being so dimensioned in its size that it corresponds to the track alteration which would arise at the contact point of the wheel with the road, if the journalling of the swinging half axles would not be yielding.

The word "frame" as herein used, is not to be understood as limited to such a device when formed separate from the body and coachwork of the vehicle, but as including such devices when formed integral with said body or coachwork.

Having now particularly described and ascertained the nature of our invention and in what manner the same is to be performed, we declare that what we claim is:

1. In a vehicle having a frame, ground-engaging wheels for said vehicle, swinging half-axles mounted on said wheels, means for pivotally mounting said swinging half-axles relatively to said frame comprising arms pivoted to said frame for motion in a transverse plane, and pivots on said arms for connecting said half-axles, spring means for resisting transverse pivotal motion of said arms, and further spring means intermediate each arm and half-axle to resist relative up and down movement of said half-axle.

2. In a vehicle having a frame, ground-engaging wheels for said vehicle, swinging half-axles mounted on said wheels, means for pivotally mounting said swinging half-axles relatively to said frame comprising arms pivoted to said frame for motion in a transverse plane, and pivots on said arms for connecting said half-axles, and spring means for resisting transverse pivotal motion of said arms, the pivot of the half-axle on the arm being higher than the pivotal connection of the arm on the frame.

3. In a vehicle having a frame, ground-engaging wheels for said vehicle, swinging half-axles mounted on said wheels, means for pivotally mounting said swinging half-axles relatively to said frame comprising a lever pivotally mounted on said frame about a substantially longitudinal axis, spring means for holding said lever in a normally central position, a pair of arms pivotally connected to said lever, means for pivotally mounting said half-axles on said arms, one half-axle on one arm and the other on the other arm, spring means between each of said arms and the lever, and spring means between each said half-axle and the adjacent arm.

4. In a vehicle having a frame, ground-engaging wheels for said vehicle, swinging half-axles mounted on said wheels, means for pivotally mounting said swinging half-axles relatively to said frame, comprising generally vertically extending arms pivoted to said frame for motion in a transverse plane, and means for pivotally connecting said half-axles on said arms at points eccentric of the afore-mentioned arm pivots so that in the normal position of said swinging half-axles and said arms, the swinging half-axle extends at an angle with its respective arm and can move transversely of the vehicle, springing means for the springing of each swinging half-axle in the substantially vertical direction about the pivot connecting the swinging half-axle with its respective arm, while permitting substantially unsprung movement of the swinging half-axle transversely of the vehicle, and further springing means for yieldingly holding each arm in its normal position relatively to the frame.

5. The combination according to claim 4 in which the pivot of the half-axle on the arm is higher than the pivotal connection of the arm on the frame.

6. In a vehicle having a frame, ground-engaging wheels for said vehicle, swinging half-axles mounted on said wheels, means for pivotally mounting said swinging half-axles relatively to said frame, comprising generally vertically extending arms pivoted to said frame for motion in a transverse plane, and means for pivotally connecting said half-axles on said arms at points eccentric of the aforementioned arm pivots so that in the normal position of said swinging half-axles and said arms, the swinging half-axle extends at an angle with its respective arm and can move transversely of the vehicle, springing means for the springing of each swinging half-axle in the substantially vertical direction about the pivot connecting the swinging half-axle with its respective arm, while permitting substantially unsprung movement of the swinging half-axle transversely of the vehicle, and further springing means for supporting the upper free ends of said arms against each other.

KARL WILFERT.
BÉLA BARÉNYI.

REFERENCES CITED

The following references are of record in the file of this patent:

UNITED STATES PATENTS

| Number | Name | Date |
|---|---|---|
| 2,104,499 | Svoboda et al. | Jan. 4, 1938 |
| 2,097,362 | Best | Oct. 26, 1937 |
| 2,047,287 | Opolo | July 14, 1936 |
| 2,206,101 | Metz | July 2, 1940 |
| 2,019,982 | Lautz | Nov. 5, 1935 |
| 2,094,582 | Chapman | Oct. 5, 1937 |
| 2,113,382 | Oppenheimer | Apr. 5, 1938 |
| 2,171,469 | Boxan | Aug. 29, 1939 |
| 2,242,584 | Kolbe | May 20, 1941 |

FOREIGN PATENTS

| Number | Country | Date |
|---|---|---|
| 612,640 | German | Apr. 30, 1935 |
| 431,921 | British | July 17, 1935 |
| 504,669 | French | Apr. 20, 1920 |